United States Patent
Guttappa et al.

(10) Patent No.: US 12,400,080 B2
(45) Date of Patent: Aug. 26, 2025

(54) SYSTEMS AND METHODS FOR PATTERN SEARCHING

(71) Applicant: CERNER INNOVATION, INC., Kansas City, KS (US)

(72) Inventors: Rajesh Theneyur Guttappa, Bengaluru (IN); Krishnendu Maity, Howrah (IN); Kaushal Kishor Tiwari, Bengaluru (IN)

(73) Assignee: Cerner Innovation, Inc., Kansas City, MO (US)

( * ) Notice: Subject to any disclaimer, the term of this patent is extended or adjusted under 35 U.S.C. 154(b) by 886 days.

(21) Appl. No.: 17/558,217

(22) Filed: Dec. 21, 2021

(65) Prior Publication Data

US 2023/0196021 A1    Jun. 22, 2023

(51) Int. Cl.
| | |
|---|---|
| *G06F 40/289* | (2020.01) |
| *G06F 16/334* | (2025.01) |
| *G06F 16/338* | (2019.01) |
| *G06F 40/205* | (2020.01) |
| *G06F 40/274* | (2020.01) |
| *G06F 40/134* | (2020.01) |
| *G06F 40/279* | (2020.01) |

(52) U.S. Cl.
CPC .......... *G06F 40/289* (2020.01); *G06F 16/334* (2019.01); *G06F 16/338* (2019.01); *G06F 40/205* (2020.01); *G06F 40/274* (2020.01); *G06F 40/134* (2020.01); *G06F 40/279* (2020.01)

(58) Field of Classification Search
CPC .... G06F 40/289; G06F 16/334; G06F 16/338; G06F 40/205; G06F 40/274; G06F 40/134; G06F 40/279
USPC ........................................................... 704/9
See application file for complete search history.

(56) References Cited

U.S. PATENT DOCUMENTS

| | | | | |
|---|---|---|---|---|
| 10,642,931 | B1 * | 5/2020 | Cockayne | G06F 40/205 |
| 11,995,096 | B2 * | 5/2024 | Cosentino | G06F 16/289 |
| 2009/0313271 | A1 * | 12/2009 | Zeidman | G06F 21/16 |
| 2011/0320876 | A1 * | 12/2011 | Klein | G06F 11/362 |
| | | | | 714/E11.21 |
| 2019/0286691 | A1 * | 9/2019 | Sodhani | G06F 40/216 |
| 2022/0107802 | A1 * | 4/2022 | Rao | G06F 16/907 |
| 2022/0317978 | A1 * | 10/2022 | Barik | G06F 8/34 |

(Continued)

OTHER PUBLICATIONS https://www.govinfo.gov/help/search-operators, retreived from the Internet Archive as of Apr. 16, 2020.*

(Continued)

*Primary Examiner* — Edwin S Leland, III
(74) *Attorney, Agent, or Firm* — Invoke

(57) ABSTRACT

Computerized systems and methods facilitate searches by identifying instances where the relative positional relationships of multiple search inputs exist within a corpus of text containing pre-compiled code. The search system identifies a presence or absence of the relative positional patterns by unidirectional sub searches anchored at a location that a primary search input occurs within the code. The directionality of the sub searches may be determined by the system based on the input field in which the search input was provided. The system may provide search results that facilitate review of the code at each location the presence or absence of the relative positional pattern exists within the corpus.

18 Claims, 7 Drawing Sheets

(56) References Cited

U.S. PATENT DOCUMENTS

2022/0317979 A1* 10/2022 Araujo Soares .... G06F 16/9024
2023/0196021 A1*  6/2023 Guttappa ............. G06F 40/205
                                                    704/9

OTHER PUBLICATIONS https://www.govinfo.gov/help/search-results, retreived from the Internet Archive as of Apr. 16, 2020.*

* cited by examiner

```
5 references
Static internal void EnableDisableForm(Form frmTmp, bool bEnable, string sCtrl1, string sCtrl2,
string sCtrl3)
{
    bool bEnableTmp = bEnable;
    Color 1Color = SystemColors.Control;
    if (bEnable)
    {
    Color 1ColorTmp = 1Color;

try
    {
        foreach (Control Control in ContainerHelper.Controls(frmTmp))
        {
            if ((String.Compare(Control.Name, sCtrl1) == 0 || (String.Compare(Control.Name,
            sCtrl2) == 0) || (String.Compare(Control.Nmae, sCtrl3) == 0))
            {
                bEnableTmp = true;
                1ColorTmp = SystemColors.Window;
            } if (Control is Button)
            {
                ControlHelper.SetEnabled(Control, bEnableTmp);
            } else if ((Control is ListBox))
            {
                ControlHelper.SetEnabled((Control, bEnableTmp);
                Control.BackColor = 1ColorTmp;
            }
            else if ((Control is RadioButton))
            {
                ControlHelper.SetEnabled((Control, bEnableTmp);
                Control.BackColor = 1ColorTmp;
            }
            else if ((Control is TextBox))
            {
                ControlHelper.SetEnabled(Control, bEnableTmp);
                Control.BackColor = 1ColorTmp;
            }
            else if ((Control is ComboBox))
            {
                ControlHelper.SetEnabled(Control, bEnableTmp);
                Control.BackColor = 1ColorTmp;
            }
            else if ((Control is Button))
            {
                ControlHelper.SetEnabled(Control, bEnableTmp);
            }
```

*FIG. 2.*

SYSTEMS AND METHODS FOR PATTERN SEARCHING

BACKGROUND

Ensuring the stability and reliability of computer programs is a continuously challenging task. New features may be desired, older features may no longer be useful or efficient, and changes to supporting hardware, software, and firmware can result in a continuous need to modify, test, and debug a programs code. A valuable tool in the coding process is a search tool. Traditional text search tools generally use exact match, wildcard, or Boolean logic to find the search input (e.g., a character string) within code (e.g., a corpus of text). In general, these search techniques work reasonably well to locate search input such as a word, phrase, or sentence within a document. For example, an exact match search works reasonably well to find each instance of the search anchor within a corpus of text. However, any deviation from the exact anchor string in the document will not be identified as positive match. Additionally, exact match searching is traditionally incapable of processing orientational relationships beyond those specifically included in the search anchor. These weakness can be somewhat addressed by wildcard searching or Boolean searching. But, these supplemental techniques suffer from similar weaknesses. For example, traditional Boolean searching may only be used where all variables in the search input can be stated as explicit true or false values. Wildcard searching can only be used where the location of variability within a search input is known prior to searching.

The weaknesses of traditional exact match, wildcard, and Boolean logic searching are uniquely magnified in a programming or markup language context. For example, the order in which a first portion of pre-compiled code is positioned relative to a second portion of code may alter or break the function of the compiled code. Paradoxically, in many cases intervening portions of code (e.g., a third portion of code positioned between the first and second portions) have no impact on the functionality of the compiled code. As such, traditional exact match, wildcard, and Boolean logic searching techniques may be incapable of detecting character string patterns in corpus of text.

SUMMARY

Embodiments of the present disclosure generally relate to systems and methods to improve searches on pre-compiled computer code by enabling identification of patterns or the absence of a pattern in the code. In some embodiments, the patterns are identified by searching for multiple code snippets within the corpus of text that makes up the programming code. When a first code snippet within the corpus of text is located, the search may anchor on that location. A search for a second code snippet proceeds from the anchor location in an enforced direction. In some embodiments, a search for a third code snippet may also proceed from the anchor location in an enforced direction opposite the direction of the search for the second code snippet. The directionality of the search for the second and/or third code snippet may be controlled via input fields in a search query interface. Further, the search may be conditionally modified to facilitate identification of anchor locations that may exist within the code that are not in the orientation identified by the search query relative to the second code snippets, third code snippets, or both the second and third code snippets.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present systems and methods for pattern searching are described in detail below with reference to the attached drawing figures, wherein:

FIG. 2 is an example portion of a corpus of text including pre-compiled programmatic code, in accordance with some embodiments of the present disclosure;

DETAILED DESCRIPTION

Figure 1A:
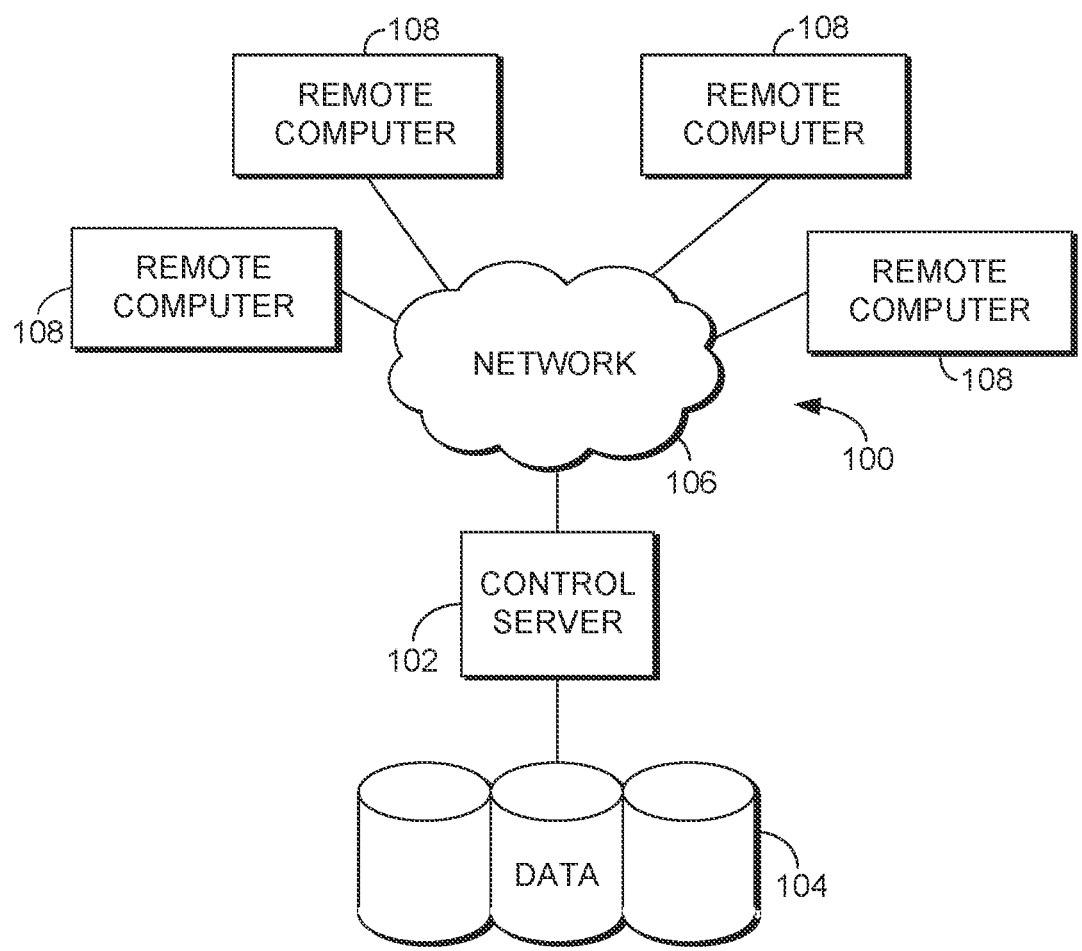
FIG. 1A is a block diagram of an exemplary computing environment suitable for use in implementing the present invention, in accordance with some embodiments of the present disclosure.

As discussed above, the order in which code is organized may impact the performance of the compiled version of the code. For example, code that fails to check that a variable is greater than zero before using the variable as a denominator in a division operation may slow the performance of the program or the processors. It may also cause the program to crash. This organizational dependence is intrinsic to computer programming due to the linear operation of computer instructions. However, in many cases the organizational dependence is based on the relative positions of the code. In other words, as long as the value of the variable is checked before using it as a denominator it may be irrelevant if the check occurs one line of code before use or a thousand lines before use. The flexibility gained from this relative dependence enables a significant variability in the absolute positioning of code while still maintaining true to the relative organization. As discussed above, this variability hinders traditional text search techniques.

Accordingly, the systems and methods disclosed relate to pattern searching. In accordance with some embodiments of the present invention, a search tool is provided that identifies a pattern in code based on the relative positions of at least two code snippets. The code snippets (e.g., a character string that includes at least part of an expression in a markup or programming language) to be searched may be received via an input fields in a user interface. In some embodiments, the interface provides the ability to submit the inputs in multiple input fields. For example, three fields may be provided as text fields or boxes and may be arranged to visually convey the pattern to search. The first field may be the top most code snippet that occurs in the pattern. The second field may be the central code snippet that occurs in the pattern. The third field may be the bottom most code snippet that occurs in the pattern. The interface may also detect any syntax within a code snippet and, where necessary, modify the code snippet appropriately (e.g., flag the syntax in a way that may prevent misidentification of the syntax during the search). The interface may display or hide this modification in the field prior to the search.

In some embodiments of pattern search, when a search is initiated, received, or requested, a corpus of text may be searched for the location of the middle code snippet. When a location is identified, the location serves as the reference point for the pattern. A top most code snippet above the reference point. A bottom most code snippet below the reference point.

The search proceeds with directional searching for the other code snippets provided as search input. If a code snippet is provided as input in the first field, the corpus of text is searched for the code snippet above the reference location. If a code snippet is provided as input in the third field, the corpus of text is searched for the code snippet below the reference location. If code snippets are provided as input in the first and third field, each code snippet may be search for as describe above for the corresponding field.

In some embodiments, the unidirectional search may begin at the reference point and proceed in the appropriate direction (e.g., up toward the first line of code in the corpus of text or down toward the last line of code in the corpus of text). In some situations this search configuration may expedite the pattern search. It is also contemplated that the unidirectional search may proceed from the appropriate end (e.g., the first line of code or the last line of code) toward the terminal reference location however.

Some embodiments of pattern searching enable conditionally sensitive searching for patterns. In other words, pattern searching facilitates locating code snippets that are in a desired pattern. Additionally, and in contrast to the traditional systems, pattern searching also facilitates locating code snippets that are not in the desired pattern and/or are not in the condition desired. In some embodiments. input fields may be included in the interface that facilitate selection of a search for the input pattern or a search for the absence of the input pattern. In other words, a search may be queried such that it returns results where a reference location is identified but at least one other condition of the search is not identified within the corpus. For example, a missing variable check for the a divide by zero problem mentioned above may be located by reporting each location where the search system can not locate the variable check code snippet above the division operation code snippet. As such, some embodiments of pattern searching described herein may detect the absence of a code pattern.

As one skilled in the art will appreciate, embodiments of our invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer readable media.

Referring to the drawings in general, and initially to FIG. 1 in particular, an exemplary computing system environment, for instance, a program development or support computing system, on which embodiments of the present invention may be implemented is illustrated and designated generally as reference numeral 100. It will be understood and appreciated by those of ordinary skill in the art that the illustrated computing system environment 100 is merely an example of one suitable computing environment and is not intended to suggest any limitation as to the scope of use or functionality of the invention. Neither should the computing system environment 100 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

With continued reference to FIG. 1A, the example computing system environment 100 includes a computing device in the form of a server 102. Components of the server 102 may include, without limitation, a processing unit, internal system memory, and a suitable system bus for coupling various system components, including database cluster 104, with the server 102. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The server 102 typically includes, or has access to, a variety of computer readable media, for instance, database cluster 104. Computer readable media can be any available media that may be accessed by server 102, and includes volatile and nonvolatile media, as well as removable and non-removable media. By way of example, and not limitation, computer readable media may include computer storage media and communication media. Computer storage media may include, without limitation, volatile and nonvolatile media, as well as removable and nonremovable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 102. Computer storage media does not comprise signals per se. Communication media typically embodies computer readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 1, including database cluster 104, provide storage of computer readable instructions, data structures, program modules, program files in a pre-compiled or pre-reasoned format, markup files, and other data for the server 102.

The server 102 may operate in a computer network 106 using logical connections to one or more remote computers 108. Remote computers 108 may be located at a variety of locations in an engineering, programming, medical or research environment, for example, but not limited to, programming or development or support center, clinical laboratories, hospitals and other inpatient settings, veterinary environments, ambulatory settings, medical billing and financial offices, hospital administration settings, home health care environments, and clinicians' offices. The remote computers 108 may be personal computers, servers, routers, network PCs, peer devices, other common network nodes, or the like, and may include some or all of the components described above in relation to the server 102. The devices can be personal digital assistants or other like devices.

Example computer networks 106 may include, without limitation, local area networks (LANs) and/or wide area networks (WANs). Such networking environments are commonplace in offices, enterprise-wide computer networks, intranets, and the Internet. When utilized in a WAN networking environment, the server 102 may include a modem or other means for establishing communications over the WAN, such as the Internet. In a networked environment, program modules or portions thereof may be stored in the server 102, in the database cluster 104, or on any of the remote computers 108. For example, and not by way of limitation, various application programs may reside on the memory associated with any one or more of the remote computers 108. It will be appreciated by those of ordinary skill in the art that the network connections shown are exemplary and other means of establishing a communications link between the computers (e.g., server 102 and remote computers 108) may be utilized.

In operation, a user may enter commands and information into the server 102 or convey the commands and information to the server 102 via one or more of the remote computers 108 through input devices, such as a keyboard, a pointing device (commonly referred to as a mouse), a trackball, or a touch pad. Other input devices may include, without limitation, microphones, satellite dishes, scanners, or the like.

Commands and information may also be sent directly from a remote device to the server 102. In addition to a monitor, the server 102 and/or remote computers 108 may include other peripheral output devices, such as speakers and a printer.

Although many other internal components of the server 102 and the remote computers 108 are not shown, those of ordinary skill in the art will appreciate that such components and their interconnection are well known. Accordingly, additional details concerning the internal construction of the server 102 and the remote computers 108 are not further disclosed herein.

Figure 1B:
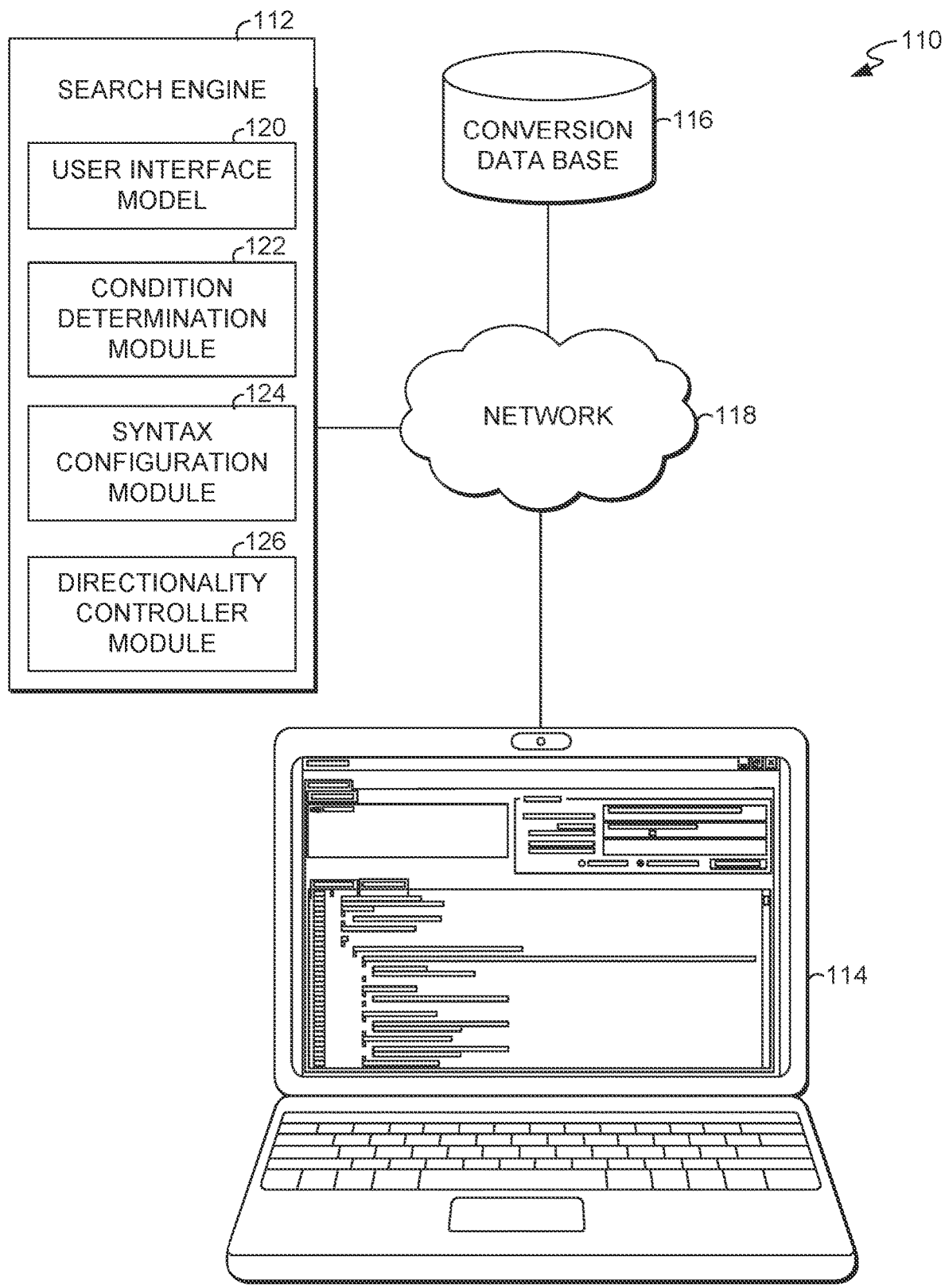
FIG. 1B is a block diagram of an exemplary system architecture in which embodiments of the invention may be employed, in accordance with some embodiments of the present disclosure.

Turning to FIG. 1B, an example system 110 for facilitating pre-compiled code pattern searching is depicted, in accordance with some aspects described herein. Generally, system 110 includes a search tool 112, a client computing device 114, conversion database 116, and network 118. The search tool 112 is shown in FIG. 1B as residing in a networked configuration independent of client computing device 114 which communicates with search tool 112 and conversion database 116 over a network 118. However, it should be understood that the search tool 112 may be located at any of a variety of different locations, including for instance as part of client computing device 114, as a standalone component, or distributed across multiple devices. Any and all such variations are contemplated to be within the scope of embodiments of the present invention.

Among other things, search tool 112 facilitates identification and recordation of the locations of multi-element patterns and/or the absence of patterns in a corpus of text. To facilitate this, in some aspects the search tool 112 may have modules that perform processes to modify the character strings provided as a search query input or modify the logic of the search. For example, search tool 112 may include a user interface module 120, condition determination module 122, a syntax configuration module 124, and a directionality controller 126. The user interface module 120 generally operates to provide a search query user interface (UI). The search query UI allows a user to enter search input and to initiate a search on a corpus of text using the entered search input.

Condition module 122 is configured to identify which condition (e.g., the presence of a pattern or the absence of a pattern) is requested in a search query submitted to the search tool 112. To facilitate the identification of the condition, the search query UI may include a selectable object associated with each potential condition. These objects may include check boxes, radio buttons, a drop down list, or any other selectable interface object. For example, a first radio button may correspond to a presence of a pattern condition and a second radio button may correspond to an absence of a pattern condition. In some embodiments, condition module 116 modifies the search logic for a search query based on the identity of the condition included with the search query. For example, a default search logic may be applied for a search for the presence of a pattern. In contracts, the condition module 116 may modify the default search logic to include not logic during the search. For instance, where a pattern not present condition (e.g., absence of a pattern) is identified the search tool may scan the corpus of text for each location where the relative orientation of the character strings of the search query are not present. Advantageously, the modification of the search logic facilitated by condition module 116 may enable identification of code that may cause runtime errors by searching for the absence of a code pattern that would prevent the error. For example, condition module 116 may facilitate, amongst other patterns, identification of portions of code that includes a potential divide by zero error and is missing a pre-calculation variable check.

Syntax configuration module 124 is configured to identify and modify characters provided in an input field of the search tool 112. Syntax configuration module 124 may automatically query the conversion database 116 while a user is entering the search input before the user provides any command to initiate a search (e.g., by selection a search button, such as the query initiation element 318 shown in FIG. 3). For example, with passing reference to FIG. 3, as character string 310 is entered into element field 304 each character within the string may be identified by syntax configuration module 124. Syntax configuration module 124 may query the conversion database 116 with each character. Conversion database 116 lists syntax characters and flagging characters. The listings may be organized in a relational database to facilitate a plurality of programing or markup languages. When the syntax configuration module 124 identifies a character that is present in the conversion database 116 (e.g., character 310), syntax configuration module 124 may modify the contents of the element field 304 with flagging character(s) 308 (e.g., [or]) surrounding the character. By modifying the character string in the input field, the syntax configuration module may facilitate configuring the character string such that the programmatic characters are recognized during the search as characters rather than as a syntax element with functional implication.

Directionality controller 126 is configured to identify and enforce the directionality of the scan within a corpus of text for each element of a multi-element search query. In some embodiments, identification of the directionality may be facilitated by the search query UI. The search query UI provides multiple input fields (e.g., search interface 300 of FIG. 3) the directionality of secondary input fields may be predetermined in relation to a primary input field (e.g., the anchor field). A first input field may be associated with a directionality above (e.g., up, before, earlier, higher, or on a line of text assigned a numerically smaller value) the anchor. A first input field may be associated with a directionality below (e.g., down, after, later, lower, or on a line of text assigned a numerically greater value). If a single character string is provided as the search input, directionality controller 126 may enable search tool 112 to use bidirectional exact match, wildcard, or Boolean searching. However, if character strings are provided as search input from two or more input fields, directionality controller 126 may enforce unidirectional exact match, wildcard, or Boolean searching based on the directionality associated with the non-anchor field(s). Notably, the search directionality of each non-anchor field may be enforced independently. In other words, the directionality controller 126 may allow bidirectional searching to locate the anchor character string. Directionality controller 126 may enforce searching above the location for one character string and may enforce searching below the location for another character string.

Turning to FIG. 2, a portion of an example corpus of text 200 is depicted, in accordance with aspects described herein. Generally, a corpus of text 200 includes one or more files of non-compiled computer executable code. Said another way, a corpus of text may include programmatic expressions prior to compiling, that when compiled by a compiler generate code that is executable by a processor. A corpus of text may also include markup expressions, that when read by a suitable system modify the presentation of data. The corpus of text may be in any programing language (e.g., Java, C, C#, python, ruby, and so forth) or any markup language (e.g., Scribe, GML, SGML, HTML, XML, and so forth). For example, the portion of corpus of text 200 depicted in FIG. 2 is illustratively provided in C#.

The portion of corpus of text 200 includes directionally dependent programmatic expressions (e.g., expression 202, expression 212, and expression 214). Programmatic expressions may include normal characters and syntax characters. In this context, normal characters may refer to any character that is not a syntax character. A syntax character is a character or combination of characters that has a predefined operational or functional meaning for the programming language relevant to the corpus of text. In other words, syntax characters may change between distinct programming languages. For example, in C# '.', '=', '==', ';', '(', and ')' among a number of other characters are predefined by the language as having specific and specialized uses. In some programming languages, these syntax characters may be associated with one or more levels of the languages syntax. Accordingly, as depicted expression 202 includes normal characters (e.g., character 204) and syntax characters (e.g., character 206).

Additionally, a corpus of text may have a directional orientation. Generally, the directional orientation of a corpus of text is organized from the beginning of the corpus of text to the end of the corpus of text. In other words, a corpus of text has a start location (e.g., a location within the corpus which nothing is before) and an end location (e.g., a location within the corpus which nothing is after). Relevantly, the directionality of a pre-compiled corpus of text is fixed in the absence of direct or indirect manipulation. For example, as depicted portion of corpus of text 200 has a vertical orientation, where expression 212 is above (e.g., before, earlier, higher, or on a line of text assigned a numerically smaller value than) expression 202. Similarly, expression 214 is below (e.g., after, later, lower, or on a line of text assigned a numerically greater value than) expression 202. Accordingly, a character string within the corpus of text can have an absolute location that may correspond to the line in the corpus of text where the character string occurs. The character string may also have a relative location that is based on a unidirectional (e.g., above 208 or below 210) comparison of the character string's absolute location to another character string's absolute location. In other words, the relative location of two character strings is determined relevant to the directional orientation of the corpus. Beginning at the start location and terminating at the end location. In some aspects, the directional orientation of a corpus of text is determined based on syntax rules for the programming language.

Figure 3:
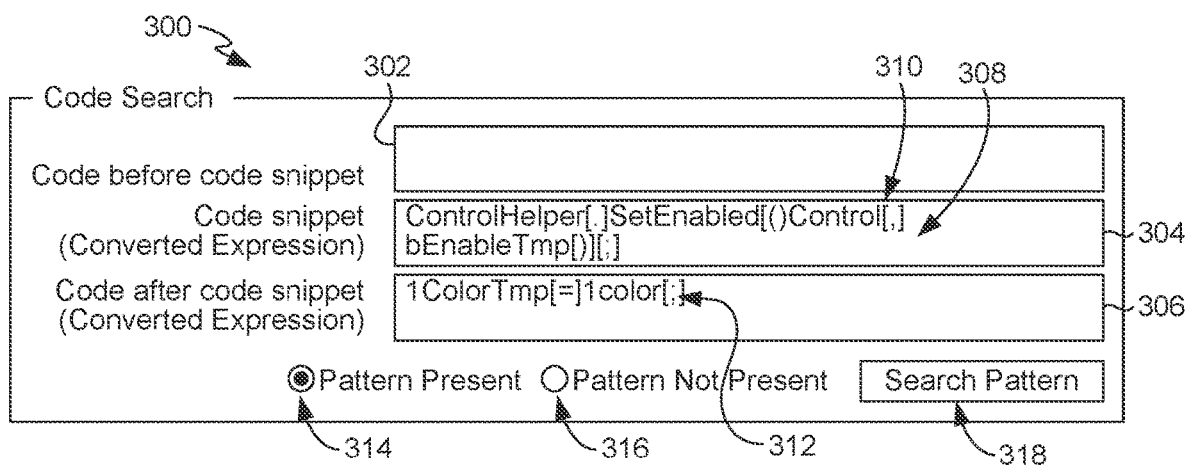
FIG. 3 is an example portion of a conditional search user interface with multiple search input fields, in accordance with some embodiments of the present disclosure.

Turning to FIG. 3, and with continued reference to FIG. 2, a portion of an example multi-element conditional search query UI 300 is depicted, in accordance with aspects described herein. Generally, search query UI 300 includes input fields and a query initiation element. Interaction with the query initiation element 318 triggers a search tool (e.g., search tool 112 described in relation to FIG. 1B) to search a corpus of text based on the input provided in one or more of the input fields. Input fields may include element fields, selectable condition elements.

Element fields (e.g., element field 302, element field 304, and element field 306) may be interface objects that hold a string of characters that are, at least partially, used during execution of a search query. Each element field may have a predetermined relationship with the other fields. For example, as depicted element field 302 provides an object to hold a string of characters that occur within the corpus of text above (e.g., before, earlier, higher, or on a line of text assigned a numerically smaller value) the primary search anchor. For another example, as depicted element field 304 provides an object to hold a string of characters that are the primary search anchor. For another example, as depicted element field 306 provides an object to hold a string of characters occur within the corpus of text below (e.g., after, later, lower, or on a line of text assigned a numerically greater value).

In some aspects, an element field may continuously, periodically, or dynamically communicate character strings held in the field to a search engine (e.g., search tool 112 described in relation to FIG. 1) For example, as character string 310 is entered into element field 304 each character within the string may be communicated to the search tool 112. For another example, input of a character 310 may trigger the interface to communicate the character to the search tool 112. Where the search tool determines that a character is a syntax character (e.g., character 310) the search engine may modify the contents of the element field with flagging character(s) 308 (e.g., [or]) around the syntax character. The flagging character(s) may be defined in a conversion database (e.g., conversion database 116 described in relation to FIG. 1) based on the syntax of the programming language of the corpus of text in some aspects. Alternatively, the interface may be programed to, directly or indirectly, identify a programmatic character within the character string by parsing terms from the character string and searching for each parsed term in a database storing predefined programmatic characters. In response to identification of a programmatic character, replacing the programmatic character with at least one conversion character defined by the database storing the predefined programmatic characters.

Additionally, multi-element conditional search query UI 300 includes a condition field. The condition field provides selectable elements that facilitate modification of the search query. Each selectable element may correspond with a different type of search condition. By way of example only and not limitation, the condition field depicted in FIG. 3 includes a pattern present radial button 314 and a pattern not present radial button 316.

Figure 4A:
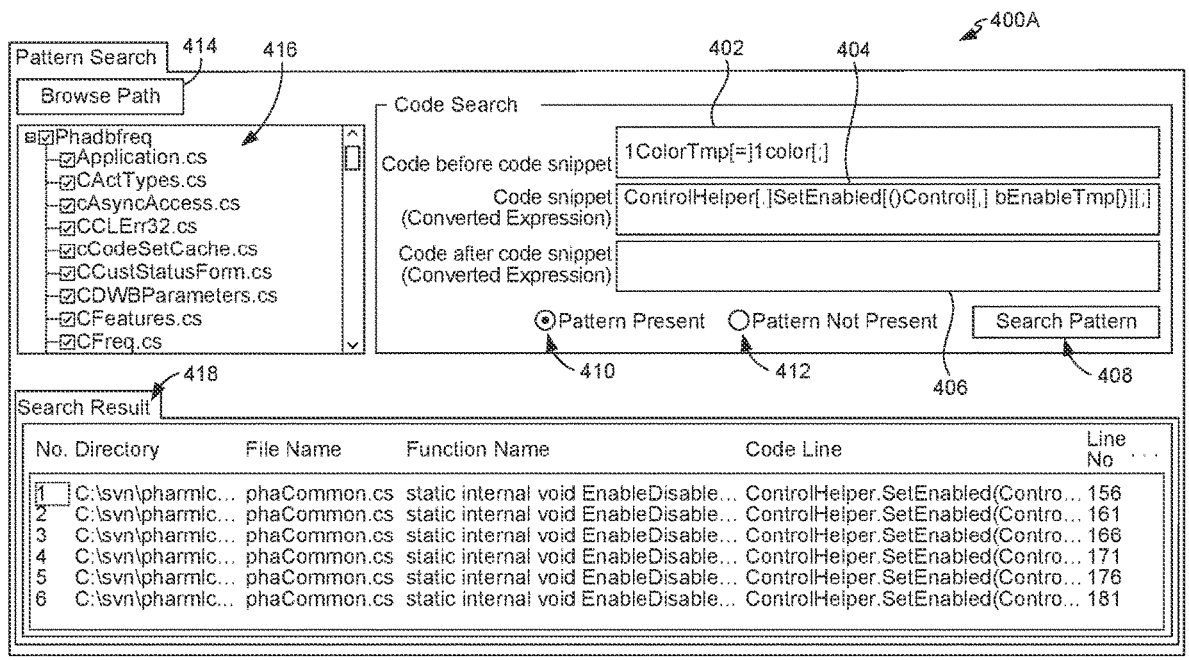
FIG. 4A is an example portion of a first instance of a conditional search user interface with multiple search input fields after an example search, in accordance with some embodiments of the present disclosure.

Turning to FIG. 4A, an example interface 400A is depicted to facilitate multi-element conditional search query is depicted, in accordance with aspects described herein. In addition to the input fields (e.g., element field 402, element field 404, element field 406, condition field 410, and condition field 412) and a query initiation element 408, interface 400A includes a corpus selection element 414, corpus identification field 416, and search result field 418. The corpus selection element 414 is generally configured to facilitate selection of a corpus of text that will be searched by a search tool. In some embodiments, interaction with this may trigger a file folder browser or any other local or network file location and selection tool. Upon selection of one or more files including a corpus of text the identity of the corpus of text may be populated into the corpus identification field 416.

Figure 4B:
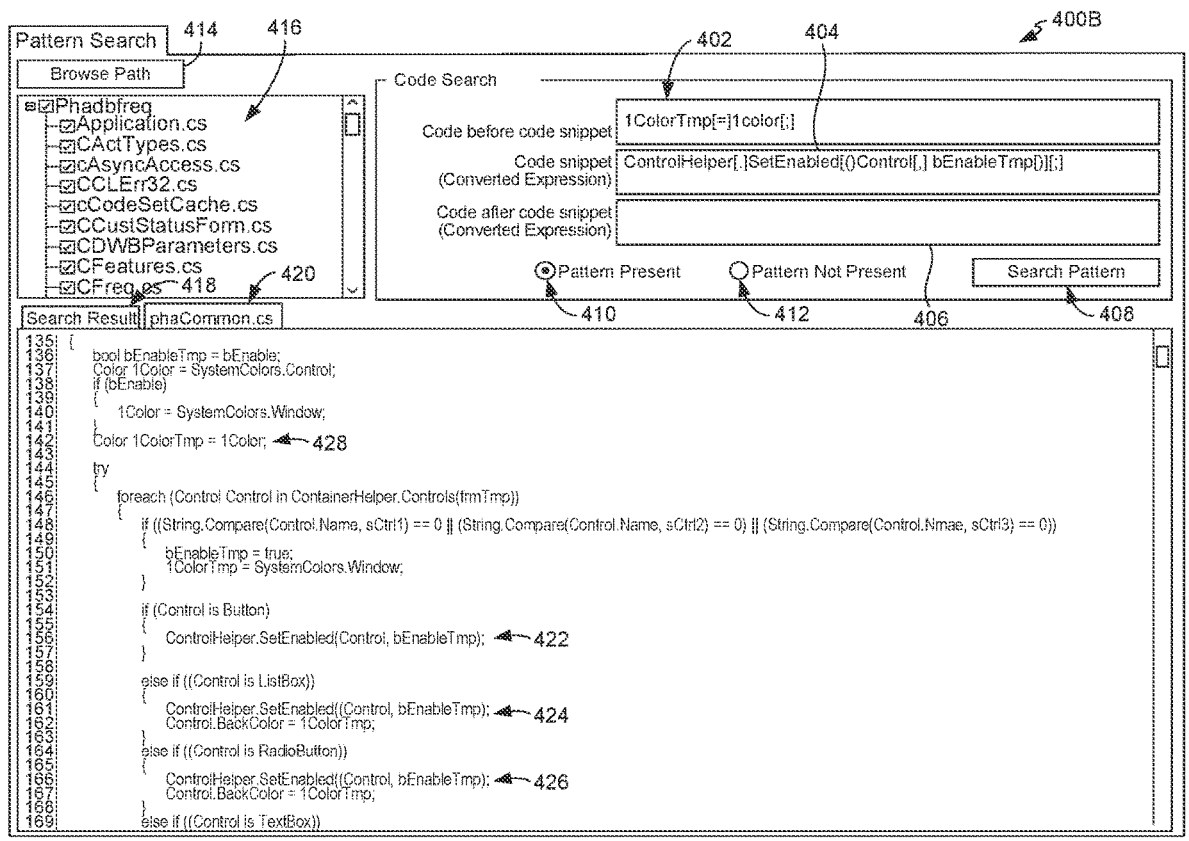
FIG. 4B is an example portion of a second instance of a conditional search user interface with multiple search input fields after an example search, in accordance with some embodiments of the present disclosure.

After submission of a search query, any positive results are output into at list in search result field 418. As depicted, the search result field 418 may include multiple pieces of data, such as the location and name of the source of the corpus of text (e.g., the file). Additionally, the search result field 418 may include the line number corresponding to the location of any search result within the corpus of text. In some embodiments, each result listed in the search result field 418 is encoded with a hyperlink that when interacted with triggers presentation of the corresponding location in a copy of the corpus of text. In some embodiments, the copy of the corpus of text is an uneditable or read only version of the corpus of text. For example, with reference to FIG. 4B and continued reference to FIG. 4A, another example interface 400B is depicted for multi-element conditional search query, in accordance with aspects described herein. Interacting with a search result in the search result field 418 may trigger the search interface to open a read-only version of the corpus of text in a new tab 420. The read-only version may highlight or otherwise non-destructively mark the code snippets in the read-only version of the corpus of text in the tab 420 that correspond to the search results. For example, code snippets 422, 424, and 426 may be visually distinguished from the other code snippets. Some embodiments may also visually distinguish the upper and/or lower code snippets of the pattern. For example, code snippet 428 may be visually distinguished from the other code snippets.

Figure 5:
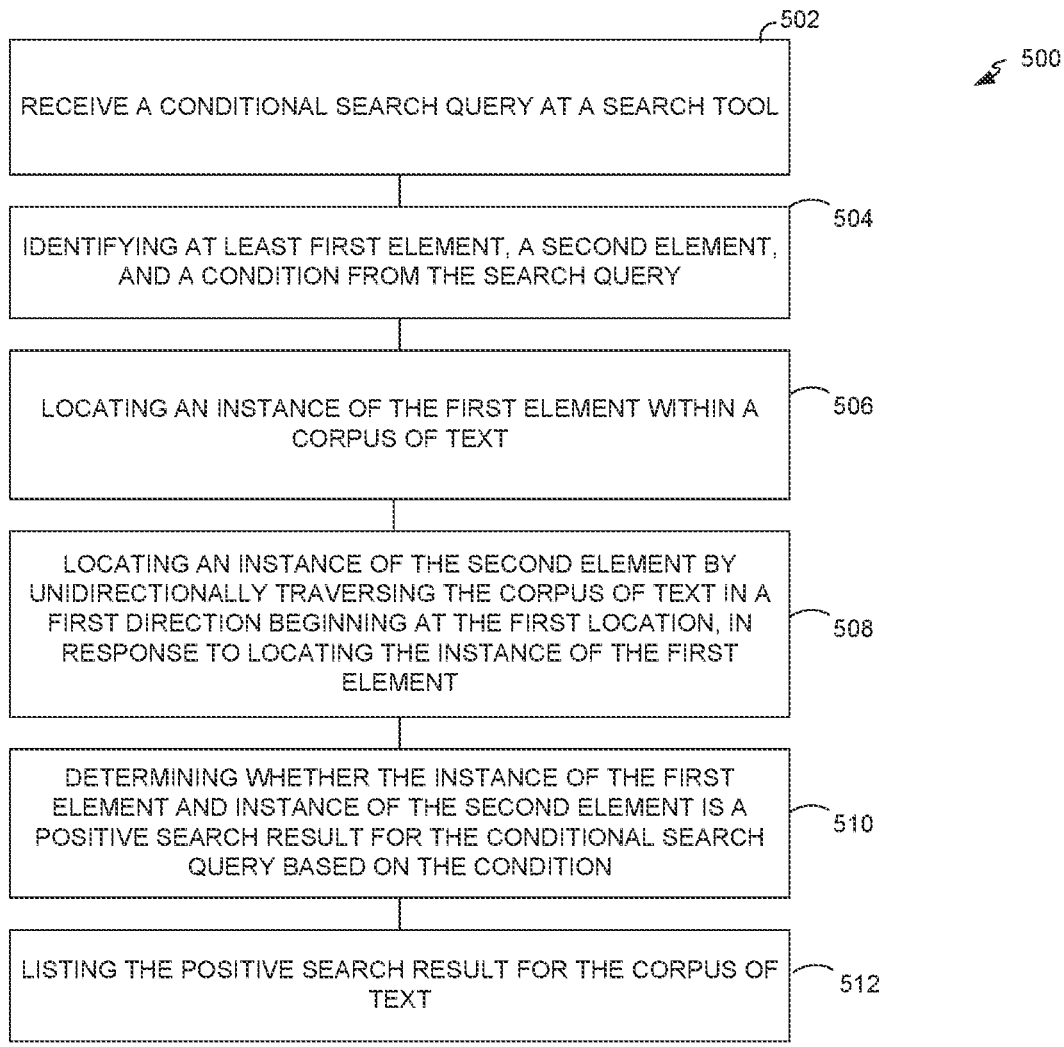
FIG. 5 is a flow diagram showing a method for a multi-element conditional search, in accordance with some embodiments of the present disclosure.

With reference to FIG. 5, and passing reference to FIGS. 1B-4B, an example method 500 is provided for multi-element conditional searching, in accordance with aspects described herein. Some embodiments of method 500 may be facilitated by one or more components of system 100. For example, pre-compiled code expressions may be provided as input in the input fields of a search query interface (e.g., search query UI 300). An input field may be predetermined to be an anchor field. The other input fields may have a predetermined relationship with the anchor field such that the relationship defines the relative directional orientation of the field. Additionally, prior to submission of a multi-element conditional search the search query interface may communicate the characters input into the input fields to a syntax configuration module (e.g., syntax configuration module 124) for processing. Where syntax characters are detected in the input fields flagging characters may be inserted around the syntax characters. In other words, in response to identification of the programmatic character (e.g. a syntax character), the programmatic character is replaced or otherwise modified with at least one flagging character defined by the database storing the predefined programmatic characters.

Method 500 may include, at block 502, receiving a conditional search query at a search tool. The conditional search query may be received in response to user interaction with a search initiation element of a search query interface. At block 504, method 500 includes identifying at least first element, a second element, and a condition from the search query. The identification of these elements may be facilitated based on the fields in which the elements were provided as input. For example, the first element may be submitted as input in a first input field, such as an anchor field. A second element may be submitted as input in a second input field. And, in some embodiments a third element may be submitted as input in a third input field.

Method 500 may include, at block 506, locating an instance of the first element within a corpus of text. For example, the search tool may perform an exact match, wildcard, or Boolean search within a corpus of text for the character string input in the anchor field. Illustratively, character string a may be provided as the input of the anchor field 404. The search tool may scan corpus of text 200 and locate character string 214 as an exact match, wildcard match, or Boolean match to character string. In response the location of character string 214 may be set as an anchor location.

Method 500 may include, at block 508, locating an instance of the second element by unidirectionally traversing the corpus of text in a first direction beginning at the first location, in response to locating the instance of the first element. The first direction can be determined based on the corpus of text, the input field associated with the second element, and the location of the anchor character string (e.g., the anchor location). For example, the corpus of text may include sequentially identifiable lines of text that begin at a first line of text and end at a last line of text. Accordingly, the first direction may be oriented from the anchor location to the first line of text. A second direction may be oriented from the anchor location to the last line of text. Continuing with the illustrative example, upon identifying the anchor location the search tool may determine the directionality of the search based on the input field associated with the second element (e.g., input field 402), which as depicted is up (e.g., directionality arrow 208). The search tool may then enforce a directionality starting at the anchor point and toward the first line of text of the corpus. Search tool may then perform an exact match, wildcard, or Boolean search for the character string input in the input field 402 within only the portion of the corpus of text 200 above the anchor location. In some embodiments, the search tool may begin the search at the anchor location and incrementally scan each line of the corpus above the anchor location. Alternatively, the search tool may being the search at the first line of the corpus of text 200 and terminate the search at the anchor location. Although not depicted, the second element may be provided in input field 406. One skilled in the art will understand that, in such an instance, the directionality enforced by the search tool would be below the anchor location.

Additionally, some aspects of block 508 include locating an instance of the third element by unidirectionally traversing the corpus of text in a second direction beginning at the first location, wherein directionality of the traversing is opposite of the directionality of the second element. Said differently, a character string may be provided in both input field 402 and input field 406. In such a case, the search tool may only scan for the character string corresponding to input field 402 above the anchor point and only scan for the character string corresponding to the input field 406 below the anchor point.

In response to locating the second element method 500 may include, at block 510, determining whether the instance of the first element and instance of the second element is a positive search result for the conditional search query based on the condition. If the condition is identified as pattern present, the search result is positive when the character strings are present and are in the relative directional orientation indicated by the input fields. If the condition is identified as pattern not present, a search result is positive when the anchor character string is present and either of the other character strings are not present or not in the relative directional orientation indicated by the corresponding input fields.

Method 500 may include, at block 512, listing the positive search result for the corpus of text. In some embodiments, the listing includes the first location of the first element in the corpus of text and an embedded link to each location in an uneditable copy of the corpus of text. In some embodiments, the listing may be provided in a search result field of the search tool. The search tool may generate an uneditable copy of the corpus of text in any suitable way. Additionally, or alternatively, the listing my be provided in a report generated in any suitable way.

As can be understood, embodiments of the present invention provide techniques for improving searches. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

What is claimed is:

1. A system for multi-element searching comprising:
one or more processors;
non-transitory computer readable media storing computer executable instructions that when executed by the one or more processors perform a method including:
receiving a conditional search query at a search engine;
identifying at least a first element, a second element, and a condition from the search query;
scanning a corpus of text for an instance of the first element to determine a first location;
responsive to determination of the first location, scanning the corpus of text for an instance of the second element by unidirectionally traversing the corpus of text in a first direction beginning at the first location, wherein directionality of the traversing is based on a element submission field of the conditional search query corresponding with the second element;
responsive to traversal of the corpus of text in the first direction without locating the second element, reporting the first location as a positive search result for the conditional search query; and
listing the positive search result for the corpus of text, the listing comprising the first location of the first element in the corpus of text and an embedded link to each location in an uneditable copy of the corpus of text.

2. The system of claim 1, wherein the conditional search query comprises data three element submission fields, the first element corresponding to a first element submission field, the second element corresponding to a second element submission field, and the third element corresponding to a third element submission field.

3. The system of claim 2, wherein the corpus of text includes sequentially identifiable lines of text that begins at a first line of text and end at a last line of text, wherein the first direction is oriented from the first location to the first line of text, and wherein the second direction is oriented from the first location to the last line of text.

4. The system of claim 2, further comprising:
identifying a third element from the search query; and
responsive to locating the first element, locating an instance of the third element by unidirectionally traversing the corpus of text in a second direction beginning at the first location, wherein directionality of the traversing is opposite of the directionality of the second element.

5. The system of claim 1, wherein the first element includes a character string and the method further comprising:
identifying a programmatic character within the character string by parsing terms from the character string and searching for each parsed term in a database storing predefined programmatic characters; and
responsive to identification of the programmatic character, replacing the programmatic character with at least one conversion character defined by the database storing the predefined programmatic characters.

6. The system of claim 1, wherein the corpus of text includes pre-compiled computer executable code in a first programming language and the first element is a character string in the first programming language.

7. A method for multi-element searching comprising:
receiving a conditional search query at a search engine;
identifying at least a first element, a second element, and a condition from the search query;
scanning a corpus of text for an instance of the first element to determine a first location;
responsive to determination of the first location, scanning the corpus of text for an instance of the second element by unidirectionally traversing the corpus of text in a first direction beginning at the first location, wherein directionality of the traversing is based on a element submission field of the conditional search query corresponding with the second element;
responsive to traversal of the corpus of text in the first direction without locating the second element, reporting the first location as a positive search result for the conditional search query; and
listing the positive search result for the corpus of text, the listing comprising the first location of the first element in the corpus of text and an embedded link to each location in an uneditable copy of the corpus of text,
wherein the method is performed by at least one device including a hardware processor.

8. The method of claim 7, wherein the conditional search query comprises data three element submission fields, the first element corresponding to a first element submission field, the second element corresponding to a second element submission field, and the third element corresponding to a third element submission field.

9. The method of claim 8, wherein the corpus of text includes sequentially identifiable lines of text that begins at a first line of text and end at a last line of text, wherein the first direction is oriented from the first location to the first line of text, and wherein the second direction is oriented from the first location to the last line of text.

10. The method of claim 8, further comprising:
identifying a third element from the search query; and
responsive to locating the first element, locating an instance of the third element by unidirectionally traversing the corpus of text in a second direction beginning at the first location, wherein directionality of the traversing is opposite of the directionality of the second element.

11. The method of claim 7, wherein the first element includes a character string and the method further comprising:
identifying a programmatic character within the character string by parsing terms from the character string and searching for each parsed term in a database storing predefined programmatic characters; and
responsive to identification of the programmatic character, replacing the programmatic character with at least one conversion character defined by the database storing the predefined programmatic characters.

12. The method of claim 7, wherein the corpus of text includes pre-compiled computer executable code in a first programming language and the first element is a character string in the first programming language.

13. One or more non-transitory computer readable media comprising instructions that, when executed by one or more hardware processors, causes performance of operations for multi-element searching, the operations comprising:
receiving a conditional search query at a search engine;
identifying at least a first element, a second element, and a condition from the search query;
scanning a corpus of text for an instance of the first element to determine a first location;
responsive to determination of the first location, scanning the corpus of text for an instance of the second element by unidirectionally traversing the corpus of text in a first direction beginning at the first location, wherein directionality of the traversing is based on a element submission field of the conditional search query corresponding with the second element;
responsive to traversal of the corpus of text in the first direction without locating the second element, reporting the first location as a positive search result for the conditional search query; and
listing the positive search result for the corpus of text, the listing comprising the first location of the first element in the corpus of text and an embedded link to each location in an uneditable copy of the corpus of text.

14. The media of claim 13, wherein the conditional search query comprises data three element submission fields, the first element corresponding to a first element submission field, the second element corresponding to a second element submission field, and the third element corresponding to a third element submission field.

15. The media of claim 14, wherein the corpus of text includes sequentially identifiable lines of text that begins at a first line of text and end at a last line of text, wherein the first direction is oriented from the first location to the first line of text, and wherein the second direction is oriented from the first location to the last line of text.

16. The media of claim 14, further comprising:
identifying a third element from the search query; and
responsive to locating the first element, locating an instance of the third element by unidirectionally traversing the corpus of text in a second direction beginning at the first location, wherein directionality of the traversing is opposite of the directionality of the second element.

17. The media of claim 13, wherein the first element includes a character string and the method further comprising:
identifying a programmatic character within the character string by parsing terms from the character string and searching for each parsed term in a database storing predefined programmatic characters; and
responsive to identification of the programmatic character, replacing the programmatic character with at least one conversion character defined by the database storing the predefined programmatic characters.

18. The media of claim 13, wherein the corpus of text includes pre-compiled computer executable code in a first programming language and the first element is a character string in the first programming language.

* * * * *